UNITED STATES PATENT OFFICE.

ERNEST WM. COOKE, OF CHICAGO, ILLINOIS.

ALLOY.

SPECIFICATION forming part of Letters Patent No. 474,443, dated May 10, 1892.

Application filed January 10, 1890. Serial No. 336,545. (No specimens.)

*To all whom it may concern:*

Be it known that I, ERNEST WILLIAM COOKE, a citizen of the United States, and a resident of Chicago, in the county of Cook and State of Illinois, have invented a certain new and useful Alloy, of which the following is a specification.

My alloy consists of cast iron or steel, aluminum, and copper, combined by means of a suitable flux.

I find that in manufacturing my alloy I may use from one to twenty parts of any one of the metals comprising said alloy, together with any amount varying from one to twenty parts of any of the other metals and obtain the same results as far as appearances, fineness, and hardness of grain indicate, and with a very slight change in the tensile strength of the resulting alloy.

In preparing my alloy the iron or steel is first melted, together with any suitable flux, and then to this molten mass I add the aluminum and copper. When the mass is sufficiently molten, I then pour it into suitable molds and allow it to cool, the alloy thus produced being of an exceedingly fine grain, very hard, and not requiring tempering to enable it to cut the hardest of steel or glass.

Another peculiar feature of this alloy is that it casts very freely, and a tool made of said alloy does not have to be "dressed" after being taken from the mold, but is immediately ready for use. In view of this feature I am enabled to cast files and other such fine work, which heretofore it has been necessary to make by the use of expensive tools and high-priced machinery.

As is obvious, this alloy is adapted for many uses, among which may be mentioned machine and lathe tools, glass-cutters' cutlery, ordnance, &c.

Having described my invention, what I claim herein as new, and desire to secure by Letters Patent of the United States, is—

1. An alloy comprising iron, aluminum, and copper, and in which the iron is in excess of the other ingredients, as set forth.

2. An alloy comprising iron, aluminum, and copper, the proportions of iron being at least seventy-five per cent. of the alloy, as set forth.

ERNEST WM. COOKE.

In presence of—
   I. MCALLISTER,
   T. E. SPECHE.